(12) United States Patent
Braun et al.

(10) Patent No.: US 9,687,892 B2
(45) Date of Patent: Jun. 27, 2017

(54) COMBINED TAILINGS DISPOSAL FOR MINERALS PROCESSES

(71) Applicants: FLSMIDTH A/S, Valby (DK); Chris Braun, West Jordan, UT (US); Vishal Gupta, Sandy, UT (US); Timothy J. Laros, Park City, UT (US); Todd Wisdom, Bethlehem, PA (US)

(72) Inventors: Chris Braun, West Jordan, UT (US); Vishal Gupta, Sandy, UT (US); Timothy J. Laros, Park City, UT (US); Todd Wisdom, Bethlehem, PA (US)

(73) Assignee: FLSMIDH A/S, Valby (DK)

( * ) Notice: Subject to any disclaimer, the term of this patent is extended or adjusted under 35 U.S.C. 154(b) by 0 days.

(21) Appl. No.: 14/894,813

(22) PCT Filed: May 5, 2014

(86) PCT No.: PCT/US2014/036776
§ 371 (c)(1),
(2) Date: Nov. 30, 2015

(87) PCT Pub. No.: WO2014/193605
PCT Pub. Date: Dec. 4, 2014

(65) Prior Publication Data
US 2016/0107209 A1 Apr. 21, 2016

Related U.S. Application Data

(60) Provisional application No. 61/828,003, filed on May 28, 2013.

(51) Int. Cl.
*B09B 3/00* (2006.01)
*B09B 5/00* (2006.01)
(Continued)

(52) U.S. Cl.
CPC .......... *B09B 5/00* (2013.01); *B01F 15/00201* (2013.01); *B09B 3/00* (2013.01);
(Continued)

(58) Field of Classification Search
CPC ........ C02F 1/008; C02F 11/12; C02F 11/121; C02F 11/127; C02F 2103/10; B09B 1/00;
(Continued)

(56) References Cited

U.S. PATENT DOCUMENTS 3,869,384 A * 3/1975 Schutte .................. B03D 1/247
208/391
4,120,051 A * 10/1978 Lohning ........... B01F 15/00201
366/142

(Continued)

FOREIGN PATENT DOCUMENTS

CA          1041451 A1    10/1978

OTHER PUBLICATIONS

The International Search Report and Written Opinion dated Sep. 17, 2014, 10 pages.

*Primary Examiner* — Joseph Drodge
(74) *Attorney, Agent, or Firm* — Jeffrey A. Sharp

(57) ABSTRACT

A system and method for tailings disposal is disclosed. A coarse tailings feed stream and a coarse tailings crusher for crushing the coarse tailings feed stream is provided. A crushed coarse tailings stream may be produced by the coarse tailings crusher, and a disposal stream comprising the crushed coarse tailings stream may be discarded as geotechnically stable waste product. The system and method may further provide a fine tailings stream and a thickener configured to thicken/dewater the fine tailings stream and produce a thickener underflow fine tailings stream. The system and method may provide a mixer configured to mix the thickener underflow fine tailings stream and the crushed
(Continued)

coarse tailings stream to form a combined tailings disposal stream. Dewatering apparatus may also be provided.

27 Claims, 5 Drawing Sheets

(51) Int. Cl.
    *C02F 11/12*     (2006.01)
    *B01F 15/00*     (2006.01)
    *B01D 21/30*     (2006.01)
    *C02F 103/10*     (2006.01)

(52) U.S. Cl.
    CPC .......... *C02F 11/121* (2013.01); *C02F 11/127* (2013.01); *C02F 2103/10* (2013.01)

(58) Field of Classification Search
    CPC . B09B 3/00; B09B 3/0033; B09B 5/00; B01F 3/18; B01F 3/188; B01F 3/2071; B01F 3/2028; B01F 15/00285; B01F 15/00201; B01F 15/0243; B01F 15/00; B01F 15/00103; G05D 11/02; G05D 11/13; C04B 18/04; C04B 18/06; C04B 18/12; C04B 18/14; B01D 17/08; B01D 17/12; B01D 21/30; C10G 3/00
    USPC ....... 210/143, 145, 739, 770; 241/15, 24.11, 241/24.13, 24.24, 24.25, 25, 68, 79, 33, 241/34, 136; 423/27; 588/252, 256; 44/621, 626, 627; 208/424
    See application file for complete search history.

(56) References Cited

U.S. PATENT DOCUMENTS

| | | | |
|---|---|---|---|
| 4,606,648 A * | 8/1986 | Coyle | B01F 7/1665 366/297 |
| 5,321,974 A * | 6/1994 | Hemmings | B01F 15/00201 73/54.31 |
| 5,439,317 A | 8/1995 | Bishop et al. | |
| 5,636,942 A | 6/1997 | Brackebusch | |
| 2008/0099380 A1* | 5/2008 | Lahaie | C10G 1/047 208/424 |
| 2011/0276169 A1* | 11/2011 | Bourg, Jr. | G05B 19/41865 700/109 |
| 2012/0138542 A1 | 6/2012 | Dang-Vu et al. | |
| 2012/0298914 A1 | 11/2012 | Laros | |
| 2013/0019780 A1* | 1/2013 | Karimi | C04B 28/006 106/708 |

* cited by examiner

COMBINED TAILINGS DISPOSAL FOR MINERALS PROCESSES

BACKGROUND OF THE INVENTION

1. The Field of the Invention

The present invention relates to tailings disposal in minerals processes, more particularly to a system of disposal that increases the geotechnical stability of the material for disposal, and most particularly to unique combinations of fine tailings streams and coarse tailings streams.

2. The Relevant Technology

Minerals processes often produce tailings: waste material that often needs to be disposed of. Minerals processes may include coal production, fertilizer production, base metals production, copper ore production, gold production, rare earth production, industrial minerals production, iron ore production or other similar processes. These processes can often produce waste material such as overburden, waste rock, and tailings that are coarse and fine. These processes may also require the disposal of tailings, which may be difficult given that fine tailings often retain moisture for an extended amount of time, even years, without treatment, and often must be kept in tailings ponds until they can become geotechnically stable materials. Geotechnical stability is often required for reclamation, but not necessarily to the stability level that may be required for underground paste-backfill operations in which Portland cement, other fixation chemicals such as lime, or geopolymers may be added to waste material to achieve a concrete type solid material.

Fine tailings streams often comprise water. This water may be difficult to reclaim or extract from a fine tailings stream due to the very small sized particles prevalent within that stream. Natural, unforced evaporation of the water from the fine tailings streams is often a very long process and usually not feasible given acreage constraints frequently encountered at minerals processing plants. Filters may be used to remove water from the fine tailings streams. However, these dewatering apparatus often have a high relative capital equipment, expenditure, and operational costs and are often very large due to the amount of water in the fine tailings streams. Small particle sizes may further complicate the dewatering process. Dewatering for water recovery becomes more and more necessary, particularly in arid climates where water costs are significant. Additionally, dewatering may reduce time in tailings ponds and may aid plant managers in reaching their goal of turning tailings into geotechnically stable land.

Coarse tailings, as well as overburden and waste rock, are also often produced in minerals processing. These materials can be large in size and are often easily disposed of on disposal piles. Some have thought to combine the coarse tailings with the fine tailings on disposal piles, but the resultant permeability due to the discrepancy in average size between the particles from fine tailings and the particles from coarse tailings leads to a mixture that may wash away and is often far from geotechnical stability.

BRIEF SUMMARY

One example illustrated herein is a method of tailings disposal. The method feeds a coarse tailings feed stream into a coarse tailings crusher and crushes the coarse tailings feed stream in the coarse tailings crusher. A crushed coarse tailings stream is removed from the coarse tailings crusher and the crushed coarse tailings stream is disposed of in a disposal stream.

Some embodiments may comprise the steps of mixing the crushed coarse tailings stream with a fine tailings feed stream, combining the crushed coarse tailings steam and the fine tailings feed stream in a combined tailings disposal steam, and then disposing of the combined tailings disposal stream in the disposal stream. The fine tailings stream may be thickened in a thickener.

Another example illustrated herein is a system of tailings disposal. The system may have a coarse tailings feed stream, and a coarse tailings crusher. The coarse tailings crusher may be configured to crush the coarse tailings feed stream, and may produce a crushed coarse tailings stream. The system may also comprise a disposal stream that comprises the crushed coarse tailings stream.

Further examples may include a thickener and a fine tailings stream, wherein the thickener may be configured to thicken/dewater the fine tailings stream and produce a thickener underflow fine tailings stream.

Some examples may include a mixer that may be configured to mix the thickener underflow fine tailings stream with the crushed coarse tailings stream, and to form a combined tailings disposal stream. The combined tailings disposal stream may comprise the thickener underflow fine tailings stream and the crushed coarse tailings stream. The disposal stream may further comprise the combined tailings stream.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
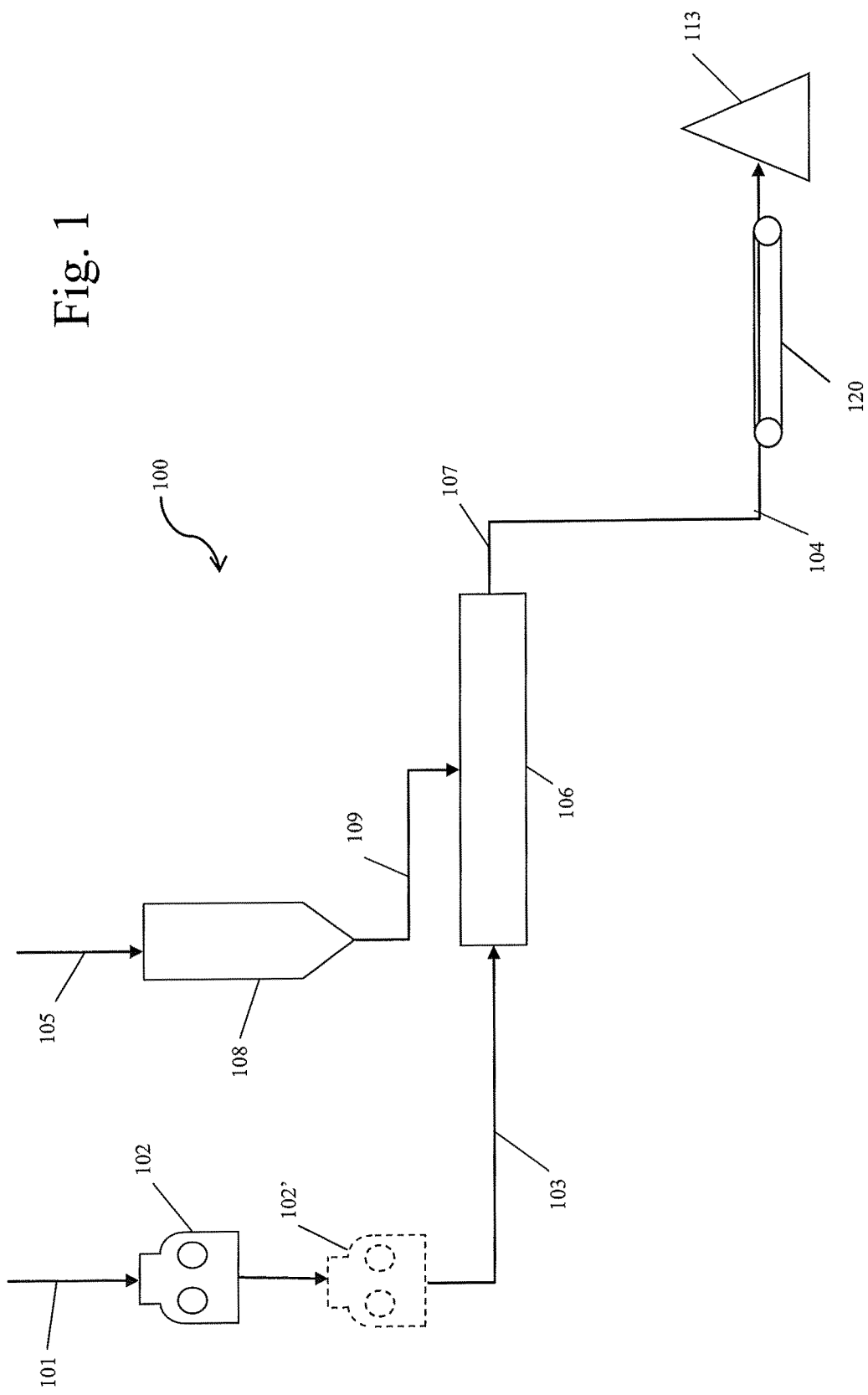
FIG. 1 illustrates an embodiment of a tailings disposal method.

The methods and systems described below allow for the disposal of fine tailings and coarse tailings together in a geotechnically stable mixture that may be fill grade material for disposal. The methods and systems allow for the disposal of fine tailings without the use of a large filter as is currently used in the minerals processing industry.

An end goal of tailings disposal is to create a geotechnically stable material that may be piled and used as stable earth. The relative similarity in size created by the present invention between a crushed coarse tailings stream and a thickener underflow fine tailings stream improves robustness to erosion, and reduces the possibility of unintended drainage from disposal sites, thus creating a more geotechnically stable material that may be disposed of. Geotechnically stable mixtures may not comprise the same material characteristics as cementitious or chemically fixated compositions and/or geopolymers which are common in paste-backfill operations and some tails disposal processes, but are strong enough to qualify as engineered fill for reclamation purposes. In other words, in some preferred embodiments, no chemical reactions take place or occur between a crushed coarse tailings stream and a thickener underflow fine tailings stream.

The systems and methods described herein may be used for any minerals processes where tailings or other waste materials are produced in the mining or processing of said minerals. In some embodiments, a fine tailings feed stream 105, 205, 305, 405 and/or a coarse tailings feed stream 101, 201, 301, 401 may comprise one or more of the following, but are in no way limited by the following list: washed coal, copper laden ore, iron ore, potash, base metals, base metal ore, precious metal laden ore, rare earth minerals, fertilizer production, industrial minerals or other minerals whose processing results in tailings production. In some embodiments, these tailings or refuse from producing these minerals may be present in a coarse tailings feed stream 101 201, 301, 401 or a fine tailings stream 105, 205, 305, 405 from the figures.

Generally, the present invention provides a method of tailings disposal comprising the steps of: a) feeding the coarse tailings feed stream into a coarse tailings crusher; b) crushing the coarse tailings feed stream in the coarse tailings crusher; c) removing a crushed coarse tailings stream from the coarse tailings crusher; and d) disposing of the crushed coarse tailings stream in a disposal stream.

Some embodiments may additionally comprise the steps of: e) feeding a fine tailings stream and the crushed coarse tailings stream to a mixer; f) mixing the fine tailings stream and the crushed coarse tailings stream in the mixer; and g) removing a combined tailings disposal stream comprising the fine tailings stream and the crushed coarse tailings stream from the mixer. In some embodiments, the step of d) disposing of the crushed coarse tailings stream in a disposal stream comprises disposing of some or all of the combined tailings disposal stream in a disposal stream.

In some embodiments, the method may further comprise: h) thickening the fine tailings feed stream in a thickener; and i) removing a thickener underflow fine tailings stream from the thickener.

In some embodiments, the mixer used may comprise a pugmill, a paddle, or a concrete-type mixer. In some embodiments, the coarse tailings feed stream may comprise refuse from a minerals processing plant.

In some embodiments, the coarse tailings feed stream may be produced from a drain and rinse, dewatering, or dry screen. Some embodiments may be particularly useful for coarse tailings feed streams that may comprise refuse from washed coal. Other minerals processes, such as those that produce iron ore, copper, and/or gold, may utilize other embodiments. In some embodiments, the coarse tailings feed stream may comprise the tailings from a pre-concentration device such as, but not limited to, a screen or other concentrating device.

Some embodiments may comprise the step of providing a process by-product stream. The process by-product stream may be a coal combustion waste stream and may comprise ash in any amount, form, or ratio. The disposal stream may also comprise some or all of the process by-product stream.

The process by-product stream may be provided to the crushed coarse tailings stream, the thickener underflow fine tailings stream or the combined tailings disposal stream. The thickener underflow fine tailings stream may be dewatered with a dewatering apparatus in some embodiments. The dewatering apparatus may comprise, for example, a filter, a centrifuge, or an equivalent dewatering device.

In some embodiments, the disposal stream may be a continuation of the combined tailings disposal stream. In some embodiments, the combined tailings disposal stream may be a separate stream from the disposal stream.

The system 100 shown in FIG. 1 shows a preferred embodiment of the present invention. It depicts a coarse tailings feed stream 101 and a coarse tailings crusher 102. The coarse tailings crusher 102 may be configured to crush the coarse tailings feed stream 101. It also depicts a crushed coarse tailings stream 103 that may be produced by and removed from the coarse tailings crusher 102. The system 100 may further comprise more than one stage of crushing the coarse tailings feed stream 101 before the crushed coarse tailings steam 103 is produced. The optional staged coarse tailings crusher 102' is indicated by the dashed outline in FIG. 1 and may crush the coarse tailings feed stream 101. In some embodiments, not shown in the figures, a plurality of crushers may be used to create a plurality of crushing stages that crush the coarse tailings feed stream 101.

A disposal stream 104 may comprise some or all of the crushed coarse tailings stream 103. A tailings conveyor 120 may convey the disposal stream 104 to a disposal pile 113. FIG. 1 also shows a fine tailings stream 105 and a thickener 108 that may be configured to thicken/dewater the fine tailings stream 105 and may produce a thickener underflow fine tailings stream 109. A mixer 106 configured to mix the thickener underflow fine tailings stream 109 and the crushed coarse tailings stream 103 may be provided. A combined tailings disposal stream 107 may be formed by and removed from the mixer 106. The disposal stream 104 may comprise the combined tailings disposal stream 107.

Figure 2:
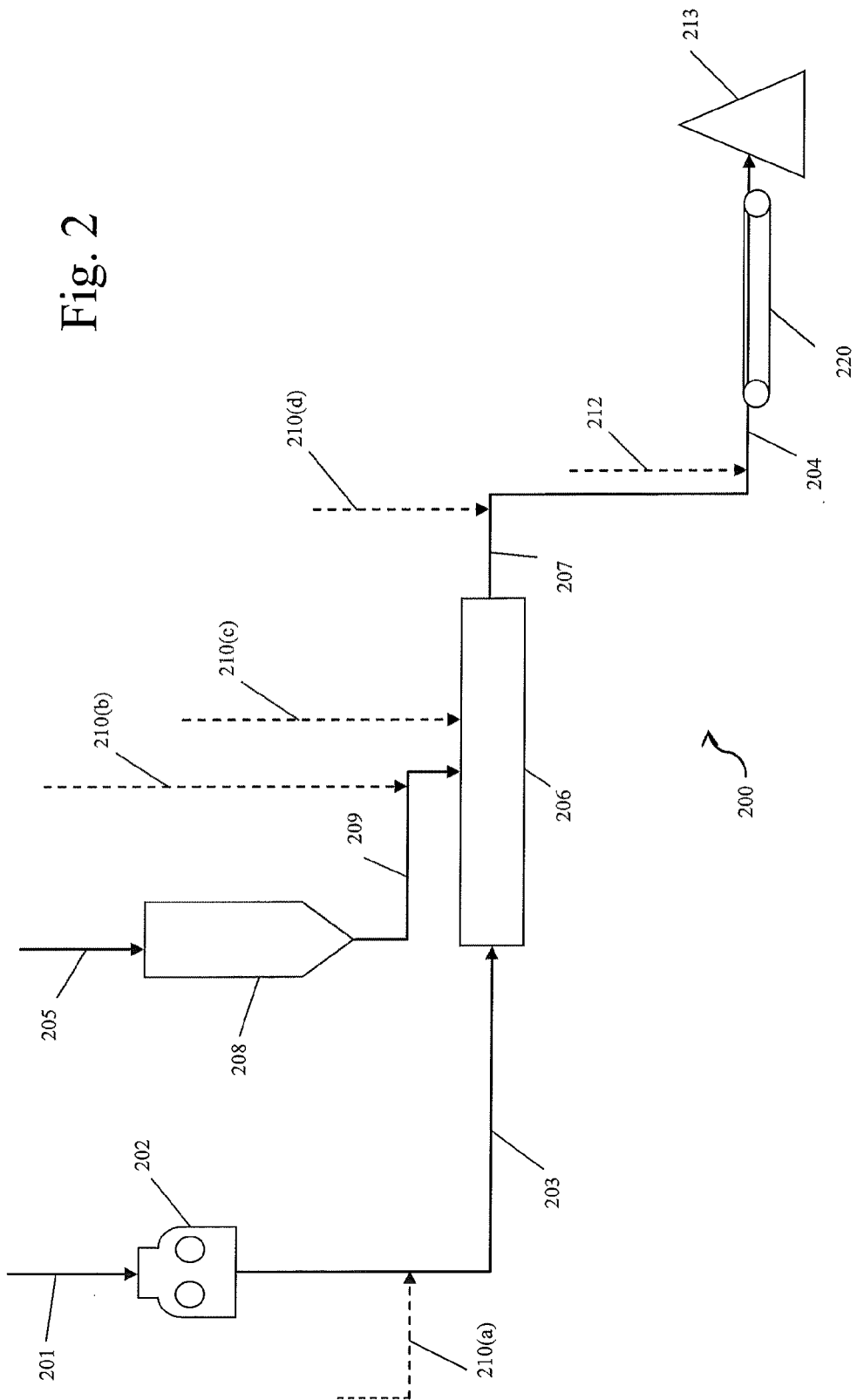
FIG. 2 illustrates an embodiment of the invention with optional feeds for process by-product and uncrushed coarse tailings.

As shown in FIG. 2, some embodiments may include a system 200 that contains one or more optional process by-product streams 210(a-d) and/or one or more streams containing uncrushed portions 212 of the coarse tailings feed stream 201. The dashed stream locations in FIG. 2 depict optional locations for process by-product stream 210(a-d) and the uncrushed portions 212 of the coarse tailings feed stream 201.

The coarse tailings crusher 202 may be configured to crush the coarse tailings feed stream 201. The crushed coarse tailings stream 203 may be removed from the coarse tailings crusher 202. The process by-product stream 210(a) may combine with the crushed coarse tailings stream 203.

The fine tailings stream 205 may be thickened in the thickener 208. The thickener underflow fine tailings stream 209 may be removed from the thickener 208. The process by-product stream 210(b) may combine with the thickener underflow fine tailings stream 209. The thickener underflow fine tailings stream 209 and the crushed coarse tailings stream 203 may be mixed in the mixer 206. The process by-product stream 210(c) may be fed into the mixer 206 directly and may be mixed therein with the thickener underflow fine tailings stream 209 and the crushed coarse tailings stream 203 in some embodiments.

The combined tailings disposal stream 207 may be removed from the mixer 206 and may be combined with the process by-product stream 210(d). The process by-product stream 210(d) may be combined with the combined tailings disposal stream 207 in any fashion as known to those in the art. The uncrushed portions 212 of the coarse tailings feed stream 201 may also be fed into the combined tailings disposal stream 207. A disposal stream 204 may comprise portions of the combined tailings disposal stream 207 and may further comprise the uncrushed portions 212 of the coarse tailings feed stream 201 and the process by-product stream 210(a-d) in some embodiments. The disposal stream 204 may be moved to a disposal pile 213 on a tailings conveyor 220.

In other embodiments, while not shown in the figures, the process by-product stream 210(a-d) may be mixed with the combined tailings disposal stream 207 in a mixer (not shown). For example, in one embodiment not depicted by the figures, the process by-product stream 210(a-d) may be added to the combined tailings disposal stream 207 while the combined tailings disposal stream 207 is on the tailings conveyor 220. The addition of supplemental by-product in the process by-product stream 210(a-d) may be particularly useful for systems comprising refuse from washing coal in the coarse tailings feed stream 201 and/or within the fine tailings stream 205.

In some embodiments, the uncrushed portions 212 of the coarse tailings feed stream 201 may obviate the need for copious amounts of process by-product, and vice-versa. For example, the addition of process by-product may make it possible to crush smaller portions of the coarse tailings feed stream 201, leaving other portions 212 uncrushed, while creating a geotechnically stable mixture for disposal. The uncrushed portions 212 of the coarse tailings feed stream 201 may then be placed in the combined tailings disposal stream 207 or the disposal stream 204 and disposed of with geotechnically stable disposal material (not shown) in a disposal pile 213. In some embodiments not shown in the figures, the uncrushed portions 212 of coarse tailings feed stream 201 may be mixed with the combined tailings disposal stream 207 in a mixer (not shown).

Figure 3:
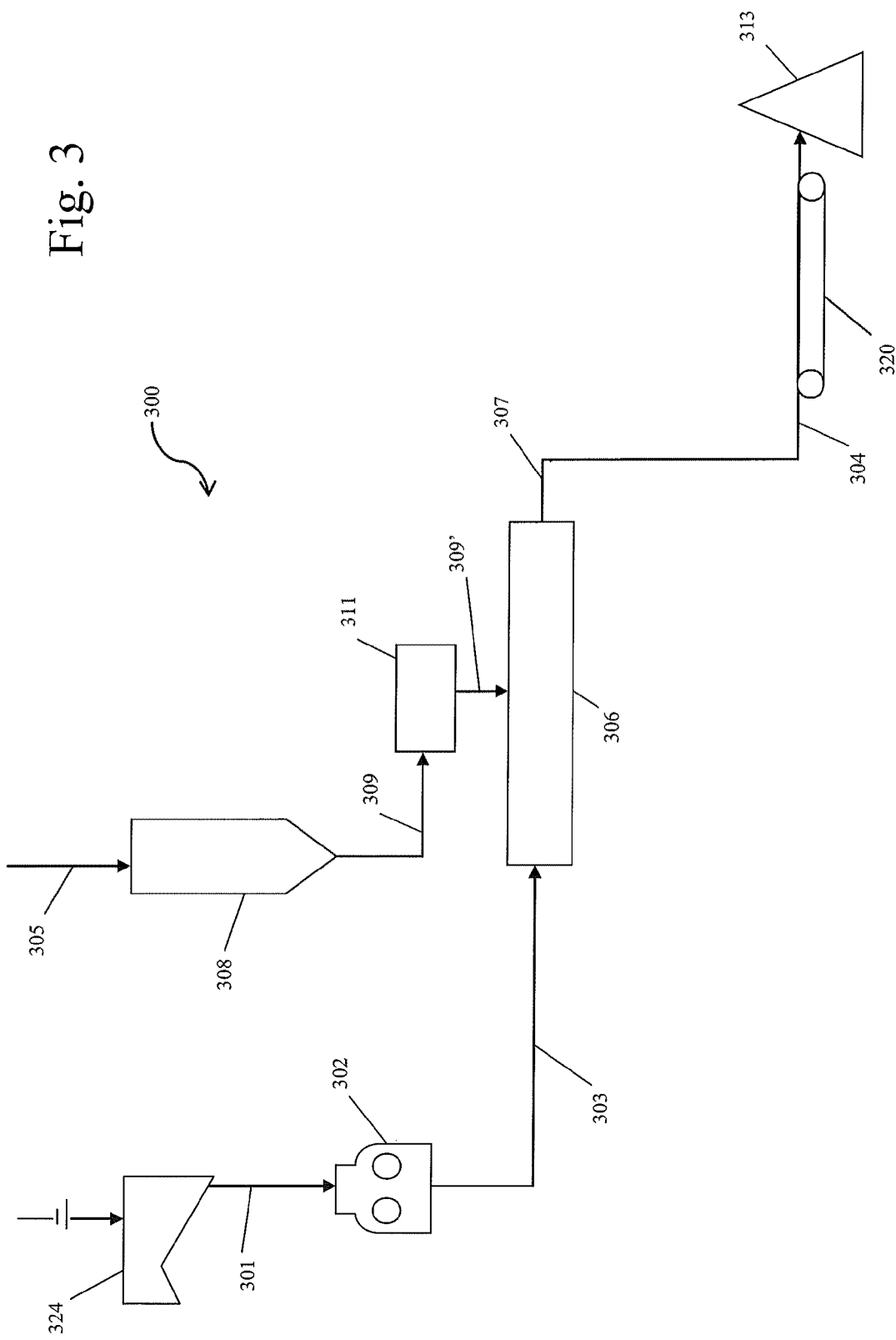
FIG. 3 illustrates an embodiment comprising a dewatering apparatus.

Some embodiments, such as the system 300 as shown in FIG. 3, may have a dewatering apparatus 311 that may be configured to dewater the thickener underflow fine tailings stream 309, and may be particularly useful for tailings disposal in processes that extract minerals, such as, but not limited to copper, iron, lead, zinc, and/or gold, or systems where it may be economical to reclaim water from fine tailings for use in other parts of the plant. Such systems include, but are not limited to, those that located in arid climates and places where water is relatively expensive.

FIG. 3 depicts a coarse tailings feed stream 301 that may be the tailings from a pre-concentration device 324. Non-limiting examples of the pre-concentrations device 324 include: a screen or other concentrating device. The coarse tailings feed stream 301 may be configured to be mixed in a coarse tailings crusher 302. The crushed coarse tailings stream 303 may be configured to be removed from the coarse tailings crusher 302. The disposal stream 304 may comprise portions of the crushed coarse tailings stream 303. The thickener 308 may thicken/dewater the fine tailings stream 305 and may produce a thickener underflow fine tailings stream 309.

The thickener underflow fine tailings stream 309 may enter the dewatering apparatus 311. A dewatered underflow fine tailings stream 309' may be removed from the dewatering apparatus 311. Non-limiting examples of the dewatering apparatus 311 may include a filter or a centrifuge.

The mixer 306 may mix the dewatered underflow fine tailings stream 309' and the crushed coarse tailings stream 303. The combined tailings disposal stream 307 may be removed from and produced by the mixer 306. The disposal stream 304 may comprise portions of the combined tailings disposal stream 307. The tailings conveyor 320 may transport the disposal stream 304 at the disposal pile 313.

Figure 4:
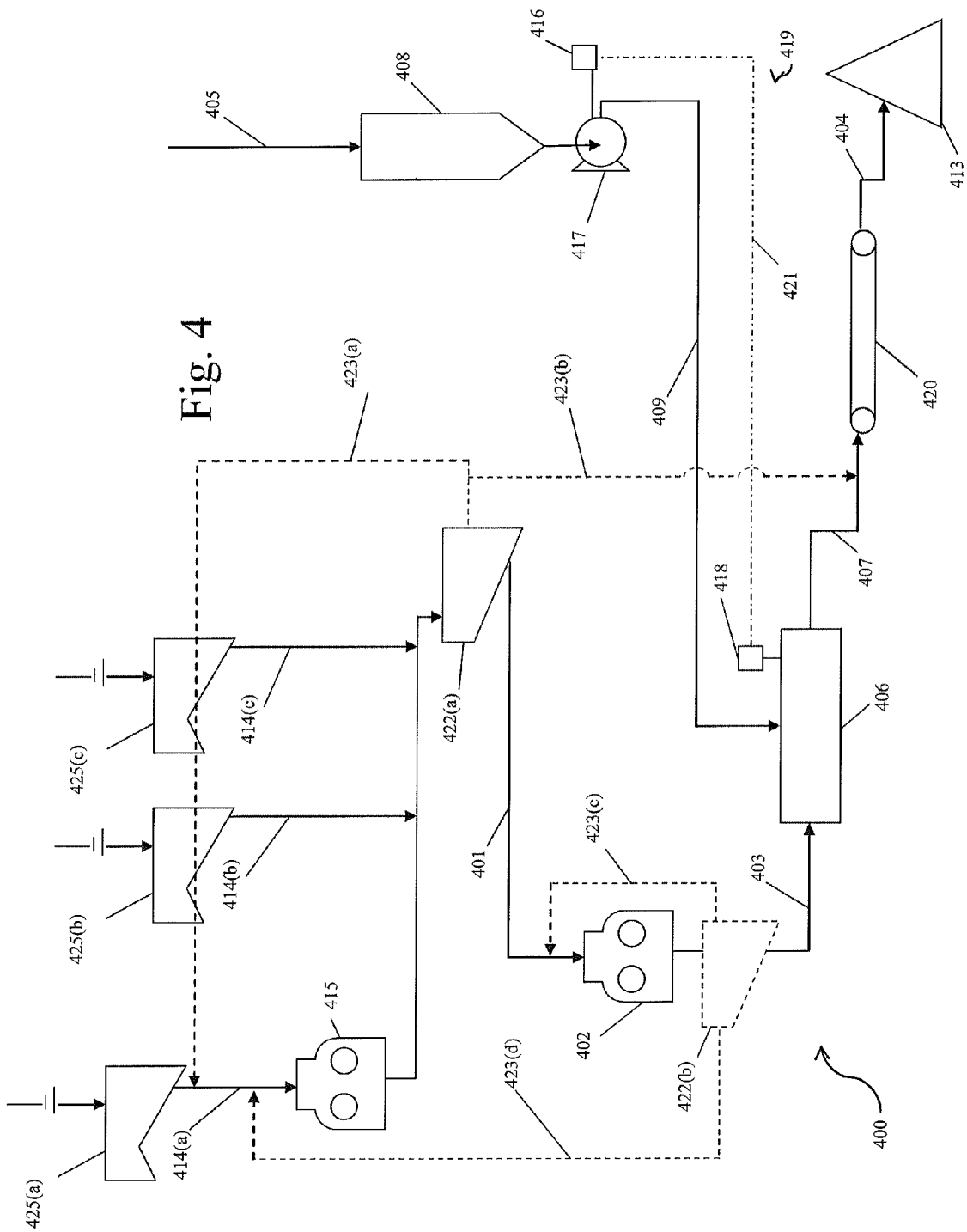
FIG. 4 illustrates an embodiment having an optional feedback loop and multiple coarse feed streams.

FIG. 4 depicts an embodiment where a system 400 may have a plurality of coarse tailings streams 414(a), 414(b), 414(c). In some embodiments, the coarse tailings streams 414(a-c) may comprise the product/products of one or more of the following: a drain-and-rinse, dewatering, or dry screen 425(a-c). In some embodiments, the coarse tailings stream 414(a) may have particles that are generally, on average, larger than particles that are in a coarse tailings stream 414(b); and the coarse tailings stream 414(b) may have particles that are generally, on average, larger than particles in the coarse tailings stream 414(c). In some embodiments, each coarse tailings stream 414(a-c) may have a different average particle size. In some embodiments, not included in the figures, one or more coarse tailings streams 414(a), 414(b), 414(c) may be provided from various parts of a plant that produce coarse tailings during minerals processing. A primary crusher 415 may be provided to crush material in the coarse tailings stream 414(a). Any one or more of these coarse tailings streams, 414(a), 414(b), 414(c), may feed into the coarse tailings feed stream 401 for crushing by the coarse tailings crusher 402. The crushed coarse tailings stream 403 may be produced by and removed from the coarse tailings crusher 402 and may feed into the mixer 406.

In some embodiments, a sizing apparatus 422(a) may size material in the coarse tailings feed stream 401. The sizing apparatus may be configured to allow smaller particles to continue to flow in the coarse tailings feed stream 401 while larger particles may be removed and recycled back into the coarse tailings stream 414(a) in the overflow tailings stream 423(a) or may be removed and disposed of in the overflow tailings stream 423(b). The overflow tailings stream 423(b) may combine with the combined tailings disposal stream 407 before disposal. In some embodiments, the sizing apparatus 422(b) may size particles in the crushed coarse tailings stream 403 and larger particles may be removed via the overflow tailings stream 423(c). The overflow tailings stream 423(c) may recycle material by combining with the coarse tailings feed stream 401. In some embodiments, the overflow tailings stream 423(d) may recycle material by combining with the coarse tailings stream 414(a).

Non-limiting examples of the sizing apparatus 422(a-b) may include a screen or a cyclone. The sizing apparatus may increase uniformity in the system 100, 200, 300, 400 by more closely controlling particle sizes in the coarse tailings feed stream 101, 201, 301, 401 or in the crushed coarse tailings stream 103, 203, 303, 403.

The fine tailings stream 405 may flow into the thickener 408. The thickener underflow fine tailings stream 409 may be removed from the thickener 408. In some embodiments, a pump 417 may pump the thickener underflow fine tailings stream 409 to the mixer 406 where it may be mixed with the crushed coarse tailings stream 403. The combined tailings disposal stream 407 may be produced by and removed from the mixer 406, and in some embodiments, may be placed on the tailings conveyor 420. The disposal stream 404 may comprise portions of the combined tailings disposal stream 407. The disposal stream 404 may be disposed of in the disposal pile 413. While not shown in the figures, the disposal stream 404 may also be placed on one or more subsequent downstream tailings conveyors.

In some embodiments, a feedback loop 419 may be configured to adjust the flow rate of the thickener underflow fine tailings stream 409 relative to the mixer 406 shaft torque. This may be done with a shaft torque monitor 418 that may relay information via a signal 421 to a variable frequency drive (VFD) 416 which may adjust the pump 417, which regulates the flow of the thickener underflow fine tailings stream 409. A control valve, not shown in the figures, may also be used in place of the VFD 416. Thus, in some embodiments, the thickener underflow fine tailings stream 409 may be controlled for consistency and a geotechnically stable mixture may be consistently formed/produced.

In some embodiments, the ratio between the average particle size of the thickener underflow fine tailings stream 109, 209, 309, 409 and the average particle size of the crushed coarse tailings stream 103, 203, 303, 403 may be approximately less than 1 to 8. The ratio may generally be between less than 1 to 10 and 1 to 1.

Figure 5:
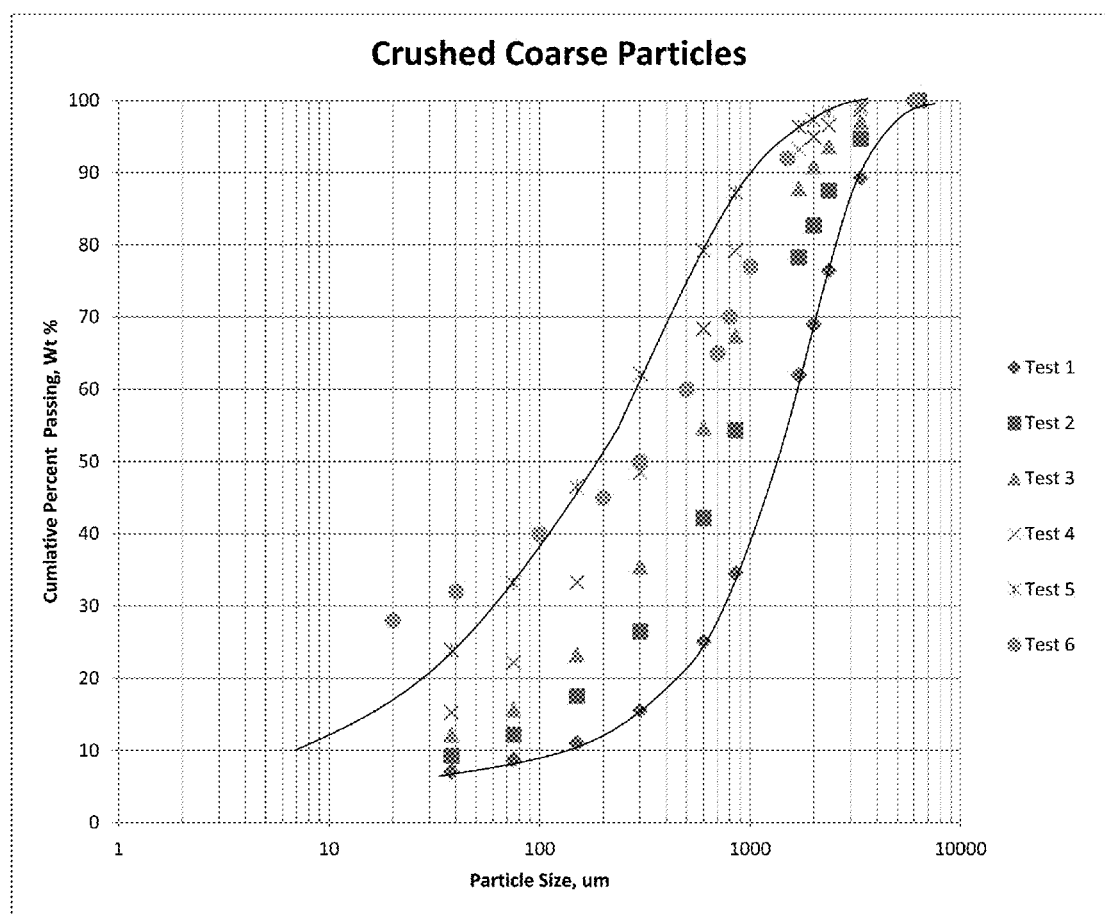
FIG. 5 illustrates preferred particle size ranges for various % weight passing values according to some embodiments.

In some embodiments, the average particle size of the coarse tailings stream 414(*a*) may have an average particle size of 50 to 300 millimeters (for example, approximately 150 millimeters). The average sized particle in the crushed coarse tailings stream 403 may be between 0.02 and 8 millimeters, for example, between 0.2 and 4 millimeters (e.g., approximately 2 millimeters) and the average sized particle in the thickener underflow fine tailings stream 409 may be between 1 and 500 micrometers (for example, approximately 250 micrometers) in some embodiments. As shown in FIG. 5, in some preferred embodiments, crushed coarse tailings stream may comprise 25-400 µm sized particles at 20% by weight passing, 55-750 µm sized particles at 30% by weight passing, 100-1000 µm sized particles at 40% by weight passing, 150-1500 µm sized particles at 50% by weight passing, 500-2000 µm sized particles at 70% by weight passing, 800-3000 µm sized particles at 80% by weight passing, and approximately 7000 to 9000 µm sized particles for 100% by weight passing.

In some embodiments, more than one mixer may be used, as may be the case if, for example and illustration only, the process by-product stream 210(*d*) is added to the combined tailings disposal stream 207 in a mixer (not shown). In some embodiments, the more than one mixer may comprise a pugmill, paddle, or concrete type mixer.

In some embodiments, a thickener 108, 208, 308, 408 may comprise a paste thickener. A high density thickener may be used in some embodiments in the place of or in addition to a paste thickener. In some embodiments, the method may further comprise thickening the fine tailings stream in a paste thickener and removing a thickener underflow fine tailings stream from the paste thickener. In some embodiments, the method may further comprise thickening the fine tailings stream in a high density thickener and removing a thickener underflow fine tailings stream from the high density thickener.

It is anticipated herein that a high density thickener is an equivalent device to a paste thickener. Where used herein the term thickener may comprise any one of the following: a paste thickener, a high density thickener, or an equivalent device.

Where used herein the term disposal pile may comprise any disposal site, impoundment, stacked pile, or any area, place, or position where tailings are disposed of.

Where used herein the term process by-product stream 210(*a-d*) may comprise one or more streams that contain process by-product material.

These are just some of the embodiments of the present invention. It should be understood that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All embodiments which come within the meaning and range of equivalency of the claims are to be embraced within their scope.

| Reference Numeral Identifiers | |
| --- | --- |
| System | 100, 200, 300, 400 |
| Coarse Tailings Feed Stream | 101, 201, 301, 401 |
| Coarse Tailings Crusher | 102, 202, 302, 402 |
| Staged Coarse Tailings Crusher | 102' |
| Crushed Coarse Tailings Stream | 103, 203, 303, 403 |
| Disposal Stream | 104, 204, 304, 404 |
| Fine Tailings Stream | 105, 205, 305, 405 |
| Mixer | 106, 206, 306, 406 |
| Combined Tailings Disposal Stream | 107, 207, 307, 407 |
| Thickener | 108, 208, 308, 408 |
| Thickener Underflow Fine Tailings Stream | 109, 209, 309, 409 |
| Dewatered Underflow Fine Tailings Stream | 309' |
| Process By-Product Stream | 210(a), 210(b), 210(c), 210(d) |
| Dewatering Apparatus | 311 |
| Uncrushed Portion of the Coarse Tailings Feed Stream | 212 |
| Disposal Pile | 113, 213, 313, 413 |
| Coarse Tailings Stream | 414(a), 414(b), 414(c) |
| Primary Crusher | 415 |
| Variable Frequency Drive (VFD) | 416 |
| Pump | 417 |
| Shaft Torque Monitor | 418 |
| Feedback Loop | 419 |
| Tailings Conveyor | 120, 220, 320, 420 |
| Signal | 421 |
| Sizing Apparatus | 422(a), 422(b) |
| Overflow Tailings stream | 423(a), 423(b), 423(c), 423(d) |
| Pre-Concentration Device | 324 |
| Drain and Rinse/Dewatering/Dry Screen | 425(a), 425(b), 425(c) |

What is claimed is:

1. A method of tailings disposal comprising:
    providing a system of tailings disposal comprising:
        a coarse tailings feed stream;
        a coarse tailings crusher configured to crush the coarse tailings feed stream and produce a crushed coarse tailings stream; and
        a disposal stream comprising the crushed coarse tailings stream;
        a fine tailings stream; and a thickener configured to thicken/dewater the fine tailings stream and produce a thickener underflow fine tailings stream;
        a mixer configured to mix the thickener underflow fine tailings stream and the crushed coarse tailings stream to form a combined tailings disposal stream; the mixer comprising a mixer shaft and a mixer shaft torque; the disposal stream further comprising the combined tailings disposal stream; and,
        a feedback loop that is configured to adjust the flow rate of the thickener underflow fine tailings stream relative to the mixer shaft torque; and
    adjusting the flow rate of the thickener underflow fine tailings stream relative to the mixer shaft torque.

2. A method as in claim 1, wherein the method also comprises the steps of:
    feeding the fine tailings stream and the crushed coarse tailings stream to the mixer;
    mixing the fine tailings stream and the crushed coarse tailings stream in the mixer;

removing the combined tailings disposal stream comprising the fine tailings stream and the crushed coarse tailings stream from the mixer; and, disposing of the crushed coarse tailings stream, wherein disposing of the crushed coarse tailings stream comprises: disposing of the combined tailings disposal stream.

3. A method as in claim 1, wherein the coarse tailings feed stream comprises refuse from washed coal.

4. A method as in claim 2, wherein the method further comprises:
thickening the fine tailings feed stream in the thickener; and
removing the thickener underflow fine tailings stream from the thickener.

5. A method as in claim 2, wherein the method further comprises:
thickening the fine tailings stream in a paste thickener; and
removing the thickener underflow fine tailings stream from the paste thickener.

6. A method as in claim 2, wherein the step of mixing the fine tailings stream and the crushed coarse tailings stream in the mixer comprises:
mixing the fine tailings stream and the crushed coarse tailings stream in a pugmill.

7. A method as in claim 2, wherein the method further comprises providing a process by-product stream, wherein the disposal stream comprises a coal combustion product.

8. A method as in claim 7, wherein the coal combustion product comprises ash.

9. A method as in claim 4, wherein the method further comprises the step of:
dewatering the thickener underflow fine tailings stream with a dewatering apparatus.

10. A method as in claim 9, wherein the coarse tailings feed stream and/or the fine tailings feed stream comprises copper laden ore.

11. A method as in claim 1, wherein said coarse tailings feed stream comprises a material selected from the group consisting of: iron ore, potash, base metals, precious metal laden ore, rare earth minerals, fertilizer production, or industrial minerals.

12. A system of tailings disposal comprising:
a coarse tailings feed stream;
a coarse tailings crusher configured to crush the coarse tailings feed stream and produce a crushed coarse tailings stream;
a disposal stream comprising the crushed coarse tailings stream;
a fine tailings stream; and a thickener configured to thicken/dewater the fine tailings stream and produce a thickener underflow fine tailings stream; and,
a mixer configured to mix the thickener underflow fine tailings stream and the crushed coarse tailings stream to form a combined tailings disposal stream; the mixer comprising a mixer shaft and a mixer shaft torque; the disposal stream further comprising the combined tailings disposal stream;
wherein the system further comprises a feedback loop that is configured to adjust the flow rate of the thickener underflow fine tailings stream relative to the mixer shaft torque.

13. A system as in claim 12, wherein the thickener comprises a high density thickener or a paste thickener.

14. A system as in claim 12, further comprising a sizing apparatus configured to size material in the coarse tailings feed stream.

15. A system as in claim 12, wherein the ratio between average particle size of the thickener underflow fine tailings stream and average particle size of the crushed coarse tailings stream is approximately less than 1 to 10.

16. A system as in claim 12, wherein said mixer is a pugmill.

17. A system as in claim 12, further comprising a dewatering apparatus that is configured to dewater the thickener underflow fine tailings stream.

18. A system as in claim 12, further comprising a process by-product stream, wherein said disposal stream further comprises the process by-product stream.

19. A system as in claim 17, wherein a portion of the coarse tailings feed stream is not crushed, wherein said disposal system further comprises said portion.

20. A system as in claim 12, wherein said coarse tailings feed stream comprises refuse from washed coal.

21. A system as in claim 12, wherein said coarse tailings feed stream comprises copper laden ore.

22. A system as in claim 12, wherein said coarse tailings feed stream comprises a material selected from the group consisting of: iron ore, potash, base metals, precious metal laden ore, rare earth minerals, fertilizer production, and industrial minerals.

23. A system as in claim 12, wherein the system further comprises more than one stage of crushing the coarse tailings feed stream before the crushed coarse tailings stream is produced.

24. A system as in claim 12, wherein the system further comprises a shaft torque monitor, wherein the feedback loop is configured to adjust the flow rate of the thickener underflow fine tailings stream relative to the mixer shaft torque.

25. A system as in claim 24, wherein the shaft torque monitor is configured to relay information, via a signal, to a variable frequency drive (VFD).

26. A system as in claim 25, wherein the variable frequency drive (VFD) is configured to adjust a pump which regulates the flow of the thickener underflow fine tailings stream.

27. A system as in claim 24, wherein the system further comprises a control valve.

* * * * *